(12) United States Patent
Gorce et al.

(10) Patent No.: US 9,452,826 B2
(45) Date of Patent: Sep. 27, 2016

(54) METHOD OF CONTROLLING AN ELECTRIC MOTOR FOR DRIVING ROTATION OF AN AIRCRAFT WHEEL

(71) Applicants: Clement Gorce, Velizy-Villacoublay (FR); David Lemay, Velizy-Villacoublay (FR)

(72) Inventors: Clement Gorce, Velizy-Villacoublay (FR); David Lemay, Velizy-Villacoublay (FR)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 0 days.

(21) Appl. No.: 14/568,185

(22) Filed: Dec. 12, 2014

(65) Prior Publication Data
US 2015/0175257 A1    Jun. 25, 2015

(30) Foreign Application Priority Data

Dec. 20, 2013    (FR) ...................................... 13 63325

(51) Int. Cl.
*B64C 25/40* (2006.01)
*H02P 29/00* (2016.01)
*H02P 23/00* (2016.01)

(52) U.S. Cl.
CPC .......... *B64C 25/405* (2013.01); *H02P 23/0004* (2013.01); *H02P 29/0005* (2013.01)

(58) Field of Classification Search
CPC ... B64C 25/405; B64C 25/00; H02P 29/0005; H02P 23/0004
USPC .......................................................... 701/3
See application file for complete search history.

(56) References Cited

U.S. PATENT DOCUMENTS

| 3,807,664 A | 4/1974 | Kelly, Jr. et al. |
| 2009/0058346 A1 | 3/2009 | Marushita et al. |
| 2009/0218440 A1 | 9/2009 | Dilmaghani et al. |
| 2009/0261197 A1 | 10/2009 | Cox et al. |
| 2012/0138734 A1 | 6/2012 | Hissong |

FOREIGN PATENT DOCUMENTS

| EP | 2 390 179 A1 | 11/2011 |
| EP | 2 439 604 A1 | 4/2012 |
| WO | 2006/078322 A2 | 7/2006 |
| WO | 2009/043082 A1 | 4/2009 |
| WO | 2013/019301 A1 | 2/2013 |

OTHER PUBLICATIONS

French Search Report corresponding to FR1363325 dated Sep. 30, 2014.

*Primary Examiner* — Brian P Sweeney
(74) *Attorney, Agent, or Firm* — Sughrue Mion, PLLC

(57) ABSTRACT

A control method for controlling an electric motor driving rotation of an aircraft wheel (4*a*, 4*b*) for generating a torque command for controlling the motor, the method being characterized in that it comprises implementing:

a first servo-control loop (23) having as its input signal a speed setpoint, having as its return signal a signal representative of the speed of the wheel or of the aircraft, and having as its output signal an acceleration setpoint (Cons_a); and a second servo-control loop (24) having as its input signal the acceleration setpoint (Cons_a), as its return signal a signal representative of the acceleration (Ar) of the wheel or of the aircraft, and as its output signal the torque command.

8 Claims, 4 Drawing Sheets

METHOD OF CONTROLLING AN ELECTRIC MOTOR FOR DRIVING ROTATION OF AN AIRCRAFT WHEEL

The invention relates to a method of controlling an electric motor for driving rotation of an aircraft wheel.

BACKGROUND OF THE INVENTION

At present, the taxiing speed of an aircraft is controlled manually by a pilot of the aircraft either by controlling the forward thrust produced by the propulsion engines of the aircraft, or by using the braking system of the aircraft wheels, or else, more rarely, by combined thrust and braking control. That way of controlling the taxiing speed of an aircraft is not very accurate and requires the pilot to adapt control to surrounding conditions, to the surface of the runway, to structural characteristics of the aircraft (weight, etc.).

The aircraft is steered manually by the pilot using a device for steering the nosewheels of the aircraft. The pilot controls the swivel angle of the nosewheels in real time in order to cause the aircraft to follow a desired path. Controlling the steering of the aircraft in that way requires the pilot to perform numerous piloting operations in real time.

OBJECT OF THE INVENTION

An object of the invention is to provide a method of controlling an electric motor driving rotation of an aircraft wheel that makes it possible to control the taxiing speed of the aircraft more accurately, in more repeatable manner, and while providing assistance in controlling the steering of the aircraft.

SUMMARY OF THE INVENTION

In order to achieve this object, the invention provides a control method for controlling an electric motor driving rotation of an aircraft wheel for generating a torque command for controlling the motor. According to the invention, the method comprises performing:

- a first servo-control loop having as its input signal a speed setpoint, having as its return signal a signal representative of the speed of the wheel or of the aircraft, and having as its output signal an acceleration setpoint; and
- a second servo-control loop having as its input signal the acceleration setpoint, as its return signal a signal representative of the acceleration of the wheel or of the aircraft, and as its output signal the torque command.

The use of electric motors driving rotation of aircraft wheels together with regulating in speed and acceleration the torque command controlling those motors makes it possible to achieve control over taxiing speed that is accurate and very insensitive to external conditions or to the structural characteristics of the aircraft. Performing such regulation also makes it possible to apply torque control that is specific to each wheel. Torque control can thus be corrected, as a function of the steering angle desired for the aircraft, depending on the undercarriages and depending on the positions of wheels within an undercarriage, thus making it possible to provide assistance in controlling steering.

BRIEF DESCRIPTION OF THE DRAWINGS

The invention can be better understood in the light of the following description made with reference to the figures of the accompanying drawings, in which.

DETAILED DESCRIPTION OF THE INVENTION

Figure 1A:
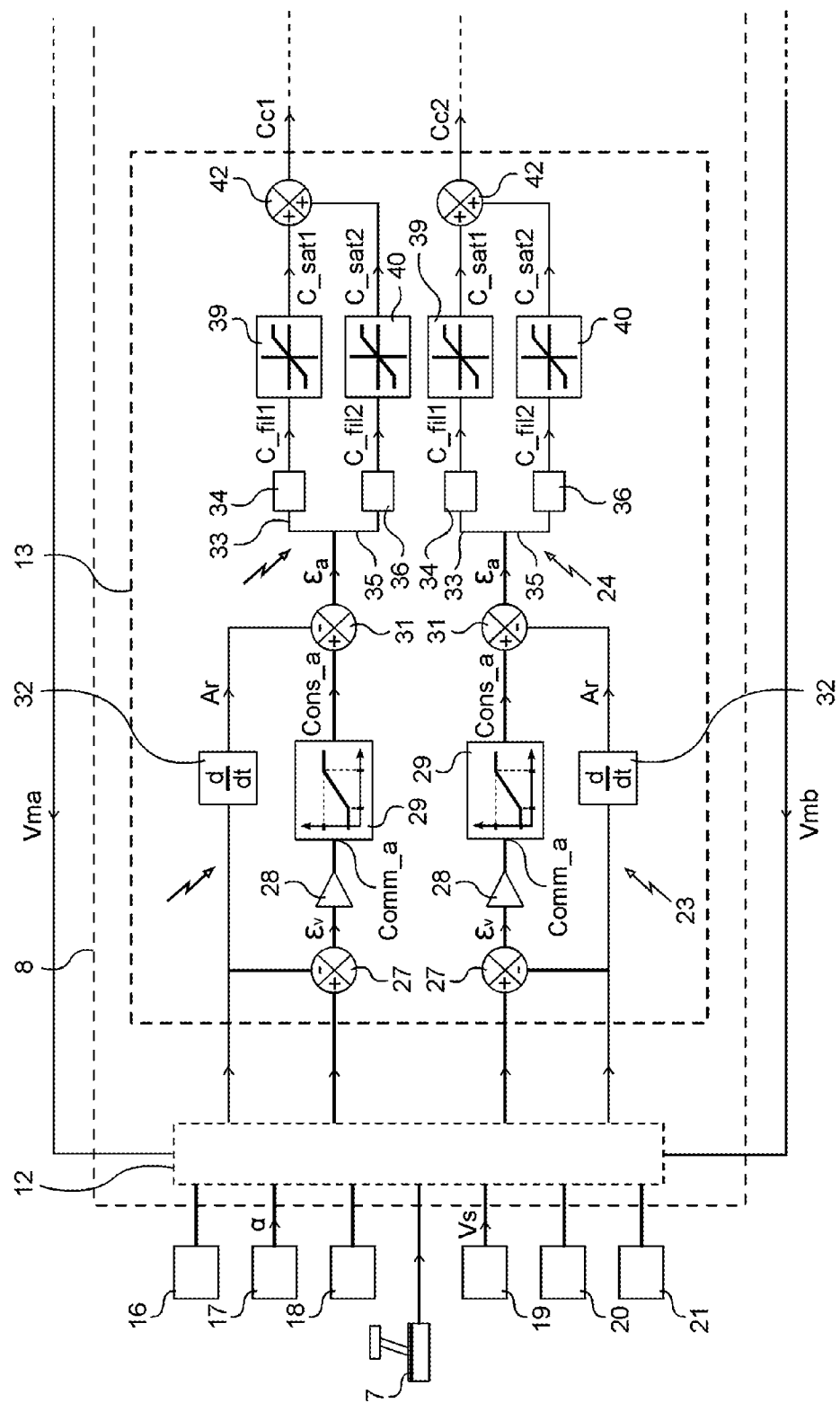
FIG. 1a and 1b form two portions of a single figure in the form of a block diagram illustrating the control method of the invention.
Figure 1B:
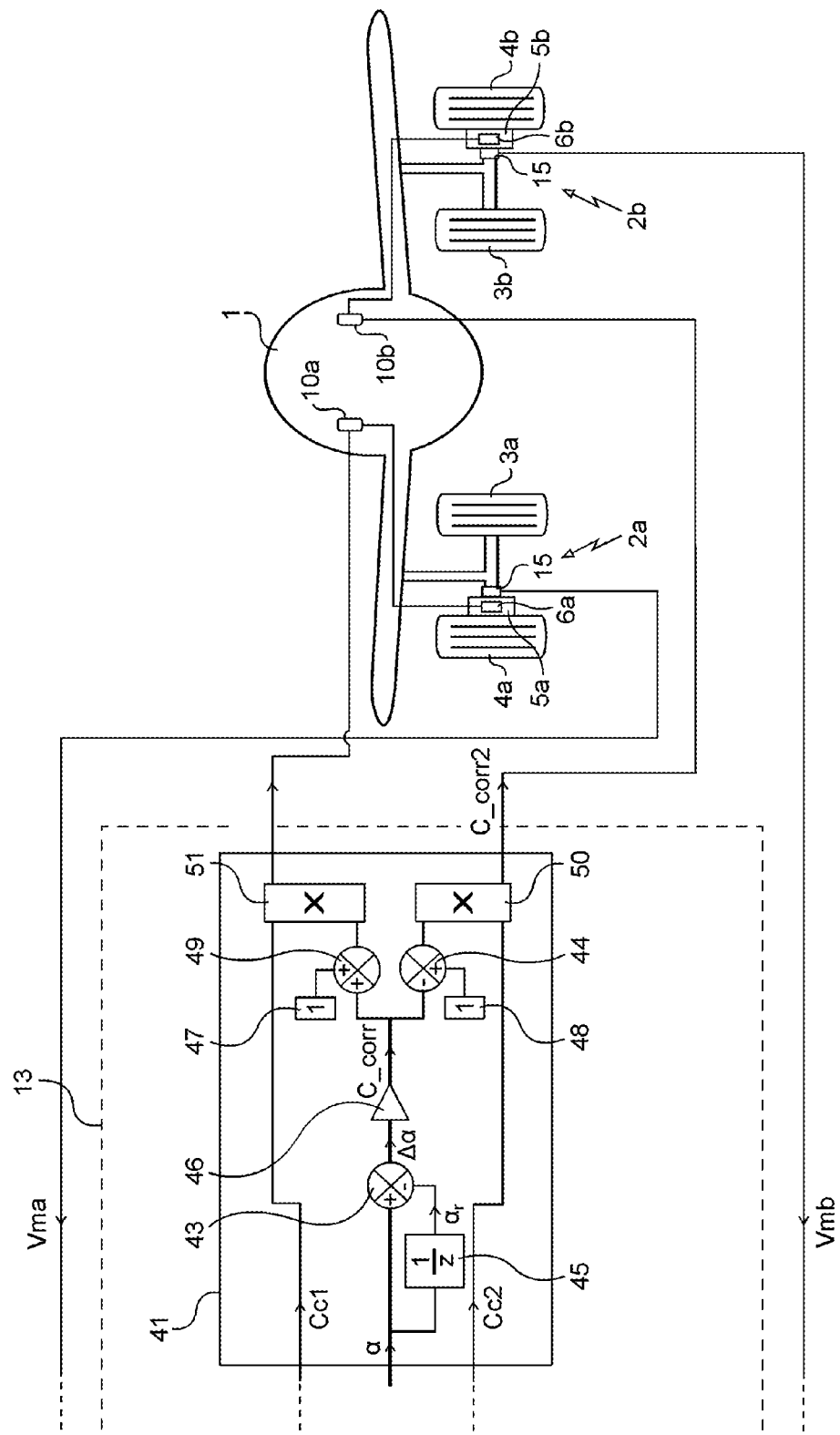

With reference to FIGS. 1a and 1b, the invention in this example is implemented in an aircraft 1 of the Airbus A320 type, having a first main undercarriage 2a with a first inner wheel 3a and a first outer wheel 4a, having a second main undercarriage 2b with a second inner wheel 3b and a second outer wheel 4b, and having a nose undercarriage with two steerable wheels (not shown in FIG. 1).

Each outer wheel 4a, 4b in this example is fitted with a respective electromechanical drive actuator 5a, 5b for driving the wheel in rotation. The aircraft 1 may thus be moved on the ground without using the propulsion engines of the aircraft.

Each electromechanical drive actuator 5a, 5b includes a respective electric motor 6a, 6b; in this example a three-phase permanent magnet synchronous motor.

The electric motors of the electromechanical drive actuators 5 are controlled by a pilot of the aircraft 1. By acting on a taxiing control lever 7 of the aircraft 1, which lever is situated in the cockpit of the aircraft 1, the pilot generates a speed order Ov that is transmitted to a centralized control unit 8. The centralized control unit 8 transforms this speed order Ov into a first torque command Cc1 for a first power unit 10a associated with the electric motor 6a of the first outer wheel 4a, and a second torque command Cc2 for a second power unit 10b associated with the electric motor 6b of the second outer wheel 4b. The power unit 10 transforms the torque commands into control currents that are delivered to the motors 6 so that they deliver torque corresponding to the torque commands.

The centralized control unit 8 comprises an acquisition module 12 and a processor module 13.

The acquisition module 12 is connected to various pieces of on-board equipment that communicate with the centralized control unit 8, and it is designed to receive, to transmit, and possibly to format data exchanged with these pieces of on-board equipment. The on-board equipment naturally includes the above-mentioned control lever 7. There are also certain sensors: wheel speed sensors 15 associated with the first outer wheel 4a and with the second outer wheel 4b; current sensors 16 associated with each electric motor 6a, 6b of the electromechanical drive actuators 5a, 5b; a steering sensor 17 for the steerable wheels of the nose undercarriage of the aircraft 1; etc. Finally, there are various data concentrators or computers forming parts of the various systems of the aircraft 1 and co-operating with the control unit: an aircraft braking system 18; an air data inertial reference unit (ADIRU) type system 19 providing the control unit with data such as the ground speed Vs of the aircraft 1; an electrical power controller 20 providing the centralized control unit with data relating to the electrical or thermal states of electrical power generators of the aircraft; etc.

The acquisition module 12 transforms the speed order Ov into a speed of rotation setpoint Cons_v common to the electric motor 6a of the first outer wheel 4a and to the electric motor 6b of the second outer wheel 4b.

The processor module 13 performs the control method of the invention, which consists in regulating a torque command for each electric motor 6 in speed and in acceleration. For this purpose, the processor module 13 receives the speed setpoint Cons_v from the acquisition module 12 and generates the first torque command Cc1 and the second torque command Cc2.

For each motor 6 of each outer wheel 4, the method of the invention comprises implementing a first servo-control loop 23 and a second servo-control loop 24.

For each motor 6, the first servo-control loop 23 has the speed setpoint Cons_v as its input signal.

The first servo-control loop 23 has a first subtracter 27 that subtracts a return signal from the speed setpoint Cons_v, where the return signal is representative of the speed of rotation Vr of the wheel, thereby calculating a speed error εv. The signal representative of the speed of rotation Vr of the wheel in this example is a measured speed of rotation Vma as measured on the first outer wheel 4a and a measured speed of rotation Vmb as measured on the second outer wheel 4b. These measured speeds of rotation Vma, Vmb are measured by the speed sensors 15 of the first and second outer wheels 4a, 4b and they are transmitted to the interface module 12. The interface module 12 generates the signal representative of the speed of rotation Vr of the wheel and transmits it to the processor unit 13.

The first servo-control loop 23 also has a speed regulator for transforming the speed error into an acceleration command Comm_a. In this example, the speed regulator is a first gain block 28 for multiplying the speed error εv by a predetermined gain.

The first servo-control loop 23 also has a limit function 29 for limiting the acceleration command Comm_a and for generating an acceleration setpoint Cons_a that is used as the input signal to the second servo-control loop 24.

The limit function is a slope of acceleration as a function of the ground speed Vs of the aircraft 1, said ground speed Vs being transmitted by the ADIRU system 19 to the centralized control unit 8.

Figure 2:
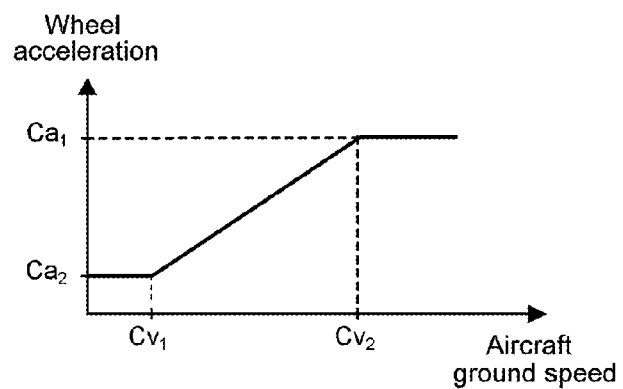
FIG. 2 is a graph showing a function for limiting acceleration of a wheel as a function of the taxiing speed of the aircraft and suitable for use in the first servo-control loop.

With reference to FIG. 2, this acceleration slope is defined in this example by four adjustable constants: a first acceleration constant ca1; a second acceleration constant ca2; a first speed constant cv1; and a second speed constant cv2.

Figure 3:
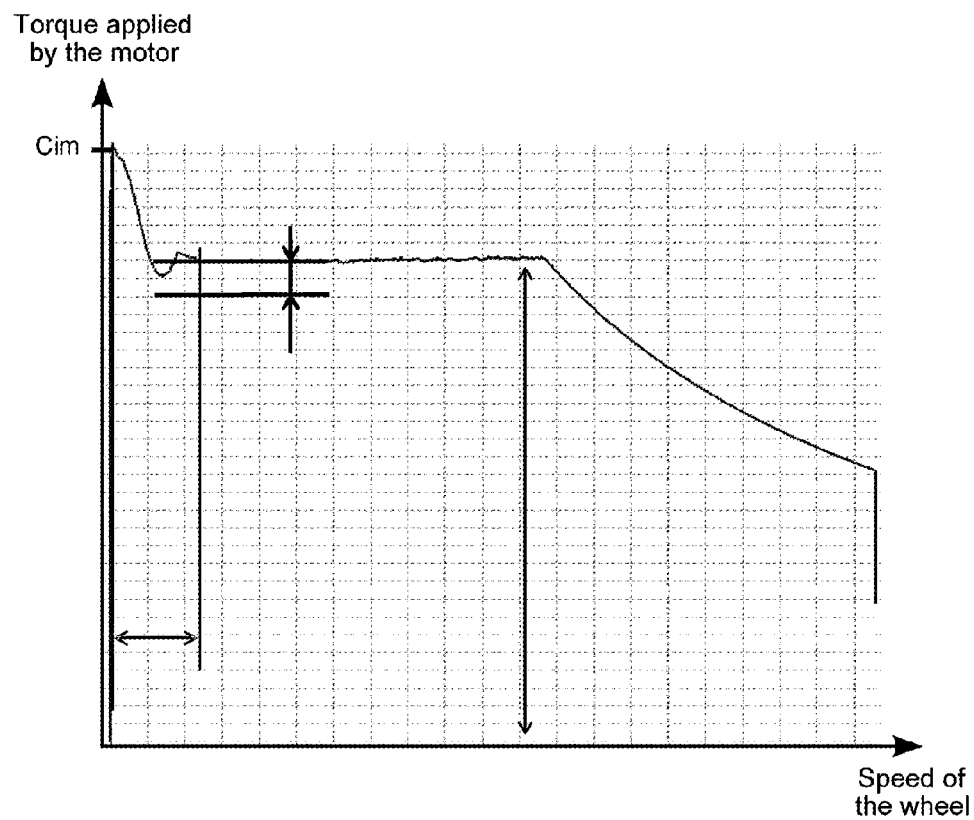
FIG. 3 is a graph showing the effect of the limit function on the torque applied by the electric motor as a function of the speed of the wheel.

With reference to FIG. 3, the first acceleration constant ca1 defines a stabilized torque Cs required during constant acceleration of the outer wheel 4 of the aircraft 1. The higher the value of this first acceleration constant ca1, the greater the stabilized torque Cs that can be delivered by the electric motor 6 of the outer wheel 4. The setting of this constant ca1 serves to adapt the stabilized torque Cs to the rolling resistance of the outer wheel 4.

The second acceleration constant ca 2 is used for defining a maximum initial torque Cim required for driving the outer wheel 4 when the aircraft 1 is stationary. The greater the value of this second acceleration constant ca2, the greater the initial maximum torque Cim that can be delivered by the electric motor 6 of the outer wheel 4.

The first speed constant cv1 is used to define a transition torque Ct corresponding to the difference between the initial torque and the stabilized torque. The value of the first speed constant cv1 must be close to a value for the speed of the outer wheel 4 when the constant acceleration is reached, thereby making it possible to avoid any large drop in torque between the initial torque and the stabilized torque.

Finally, the second speed constant cv2 is used to define a time period T needed by the motor 6 to reach the stabilized torque starting from the moment when the initial torque is applied: the greater the value of this second speed constant, the longer the time period T.

The second servo-control loop 24 has as its input the acceleration setpoint Cons_a generated by the first servo-control loop 23.

The second servo-control loop 24 has a second subtracter 31 that subtracts a return signal from the acceleration setpoint Cons_a, where the return signal is representative of the acceleration Ar of the wheel, and it thus calculates an acceleration error εa. The signal representative of the acceleration Ar of the wheel is obtained in this example by differentiating the signal that is representative of the speed Vr of the wheel, i.e. by differentiating the speed Vma for the first outer wheel 4a and the speed Vmb for the second outer wheel 4b. The differentiation is performed by a differentiator unit 32.

The second servo-control loop also includes a first branch 33 with a lowpass filter 34 and a second branch 35 parallel to the first branch 33 and including an integrator 36. Each of these branches has as its input the acceleration error εa.

The lowpass filter 34 of the first branch 33 is a first-order filter for making the regulation sufficiently reactive to disturbances such as those associated with applying drive to the wheel, with a slope of the runway on which the aircraft is taxiing, with the wind, etc. The lowpass filter 34 has as its input the acceleration error εa and it outputs a first filtered torque C_fil1. In this example, the lowpass filter 34 has the following transfer function:

$$K_1 \cdot \frac{1}{1 - T_1 \cdot z^{-1}}$$

where $K_1$ and $T_1$ are adjustable constants.

The integrator 36 does not generate any static error and serves to enable the regulation to present a response time that is acceptable. The integrator 36 has as its input the acceleration error Ca and it outputs a second filtered torque C_fil2. In this example, the integrator 36 has the following transfer function:

$$K_2 \cdot \frac{1}{1 - z^{-1}}$$

where $K_2$ is an adjustable constant.

The first branch 33 also has a first torque saturation function 39 having as its input the first filtered torque C_fil1 and outputting a first torque output C_sat1. The second branch 34 has a second torque saturation function 40 having as its input the second filtered torque C_fil2 and outputting a second torque output C_sat2.

The first saturation function 39 defines a first torque threshold Sc1, which limits the first filtered torque. The second saturation function defines a second torque threshold Sc2 having as its value the value of the first torque threshold Sc1 minus the value of the output from the lowpass filter, i.e. the first filtered torque C_fil1.

Thus, if the first filtered torque C_fil1 has a maximum value equal to 120 newton-meters (N.m) and if the value of the first torque threshold Sc1 is 200 N.m, then the second torque output C_sat2 is limited by a torque of 80 N.m.

Finally, the second servo-control loop 24 has a first summing circuit 42 that sums the first torque output C_sat1 and the second torque output C_sat2 and thus generates the torque command for the motor of the electromechanical actuator of the wheel.

The method of the invention is thus performed to generate a first torque command Cc1 for the power unit 10a of the electric motor 6a associated with the first outer wheel 4a and a second torque command Cc2 for the power unit 10b of the electric motor 6b of the second outer wheel 4b.

The method of the invention also involves performing an assistance function 41 to assist steering the aircraft 1. The purpose of this assistance function 41 is to correct the first torque command Cc1 and the second torque command Cc2 as a function of a steering angle α of the steerable wheels of the nose undercarriage of the aircraft 1 so as to assist the steerable wheels of the nose undercarriage in steering the aircraft 1.

The assistance function 41 is performed in the processor module 13 and it has as its inputs the first torque command Cc1, the second torque command Cc2, and the steering angle α. The assistance function 41 has third and fourth subtracters 43 and 44, a unit delay block 45, second, third, and fourth gain blocks 46, 47, 48, a second summing circuit 49, and two multipliers 50 and 51.

The third subtracter 43 subtracts from the steering angle α a delayed steering angle αr that results from the action of the unit delay block 45 on the steering angle α. The result of this subtraction is a variation in angle Δα, which is zero when the steering angle α is constant over time, and otherwise is non-zero. This angle of variation Δα is then multiplied by the second gain block 46 that has configurable gain, thereby transforming the angle variation Δα into a correction torque C_corr. This correction torque C_corr is applied as input to the second summing circuit 49 and as input to the second subtracter 44. The third and fourth gain blocks 47 and 48, which present unit gains, are connected respectively to a second input of the second summing circuit 49 and to a second input of the fourth subtracter 44. The output from the second summing circuit 49 is connected to a first input of the first multiplier 50. The output of the fourth subtracter 44 is connected to a first input of the second multiplier 51. The first torque command Cc1 and the second torque command Cc2 are connected respectively to a second input of the first multiplier 50 and to a second input of the second multiplier 51. The output from the first multiplier is a first corrected torque command C_corr1 for the motor 6a of the first outer wheel 4a. The output from the second multiplier 51 is a second corrected torque command C_corr2 for the motor 6b of the second outer wheel 4b.

The difference between the first corrected torque command C_corr1 and the second corrected torque command C_corr2 is a differential torque C_diff that tends to steer the aircraft 1 in the direction of the steering angle α.

Advantageously, the assistance function 41 for assisting steering the aircraft 1 is activated and deactivated by pin-programming. The centralized control unit is provided for this purpose with an incorporated configuration connector. By connecting this incorporated configuration connector to an external configuration connector provided with pins presenting a first electrical configuration, the function 41 for assisting steering of the aircraft 1 is activated. By connecting this incorporated configuration connector to an external configuration connector having pins presenting a second electrical configuration, the function 41 of assisting in steering the aircraft 1 is deactivated.

Figure 4:
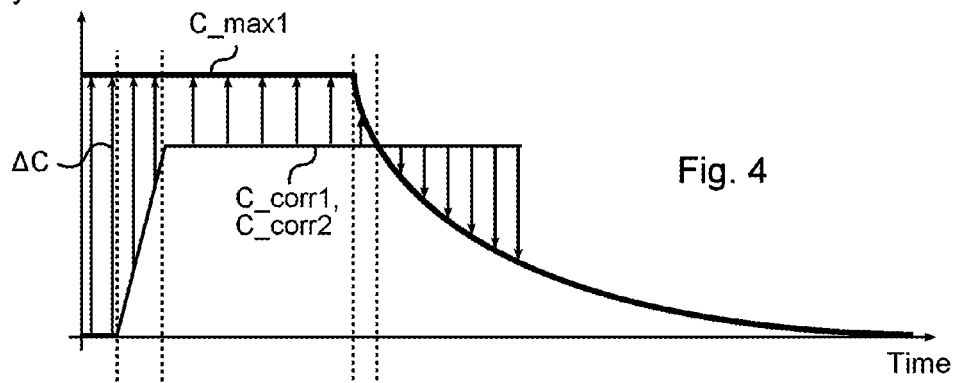
FIG. 4 is a graph plotting as a function of time a first maximum torque; a torque command for the electric motor; and a torque margin that exists between the first maximum torque and the torque command.
Figure 5:
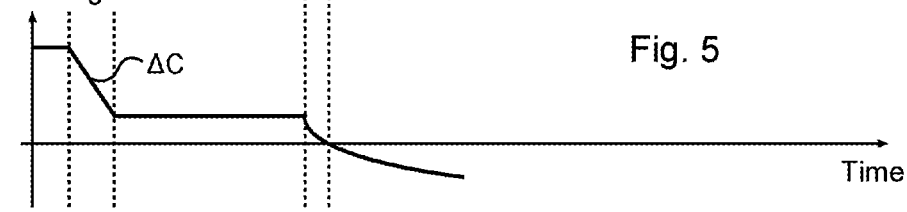
FIG. 5 is a graph similar to that of FIG. 4 showing the torque margin directly.

With reference to FIGS. 4 and 5, the method of the invention also includes performing an anti-saturation function for each electric motor. The anti-saturation function is performed in the power unit 10 associated with the electric motor 6. The anti-saturation function calculates a torque margin ΔC that exists between a first maximum torque C_max1 for the electric motor 6 in question and a corrected torque command C_corr1, C_corr2 as output by the second servo-control loop 24. If the torque margin ΔC is positive, the anti-saturation function allows a greater torque to be commanded. If the torque margin ΔC is negative, the anti-saturation function decreases the torque command down to the maximum acceptable torque. The first maximum torque C_max1 depends on the characteristics of the motor and on the speed of rotation of the motor.

The torque margin ΔC visible in FIG. 4 corresponds to the aircraft 1 taxiing forwards. In order to define the torque margin ΔC in the event of the aircraft 1 taxiing backwards, an absolute value is used of the corrected torque command C_corr which is subtracted from the first maximum torque C_max1 in order to obtain a torque margin ΔC similar to the margin corresponding to the aircraft taxiing forwards.

The method also comprises limiting the corrected torque command C_corr1, C_corr2 as a function of the electricity consumption of the motors in order to avoid overloading the electrical power generators of the aircraft that are supplying the power units with the electric power needed for operating the electric motors. The torque is thus limited by a second maximum torque C_max2.

The data relating to overloading the generators is supplied to the centralized control unit 8 by the electric power controller 20.

The method also includes applying a limit to the corrected torque command C_corr1, C_corr2 as a function of the temperature of the electricity generators in order to avoid that temperature becoming too high. The torque is thus limited by a third maximum torque C_max3.

The data relating to the temperature of the generators is likewise supplied to the centralized control unit 8 by the electrical power controller 20.

The anti-saturation function and the limitations on the corrected torque command are performed in the power unit 10 associated with the electric motor 6.

Alternatively, the anti-saturation function and the application of limits to the corrected torque command are performed simultaneously by performing a combined limit function. This combined limit function calculates an overall acceptable maximum torque C_maxg equal to the minimum of the first, second, and third maximum torques C_max1, C_max2, and C_max3, and it limits the corrected torque command by using this overall acceptable maximum torque C_maxg.

It should be observed that the method of the invention in this example can be inhibited in certain particular situations. A first particular situation occurs when the aircraft 1 is taxiing forwards and a negative speed command is given. A second particular situation occurs when the aircraft 1 is taxiing rearwards and a positive speed command is given. A third particular situation occurs when a speed command is given that is lower than the present speed of the aircraft 1. A fourth particular situation occurs when braking of a wheel of the aircraft 1 is commanded via the braking system. A fifth particular situation occurs when a command is given for a wheel speed that is too great.

The method is inhibited in the first three situations in order to prevent a regenerative braking phenomenon occurring: electrically powering the motor 6 would then lead not to the wheels being driven in rotation but to the wheels being braked, thereby producing energy that would tend to increase the temperature of the electric motor. The method is inhibited in the fourth situation in order to avoid any loss of braking effectiveness and any mechanical damage to the motor 6 or to the drive actuator 5. The method is inhibited in the fifth situation in order to avoid any mechanical or electrical damage impacting the motor 6 or the drive actuator 5.

Figure 6:
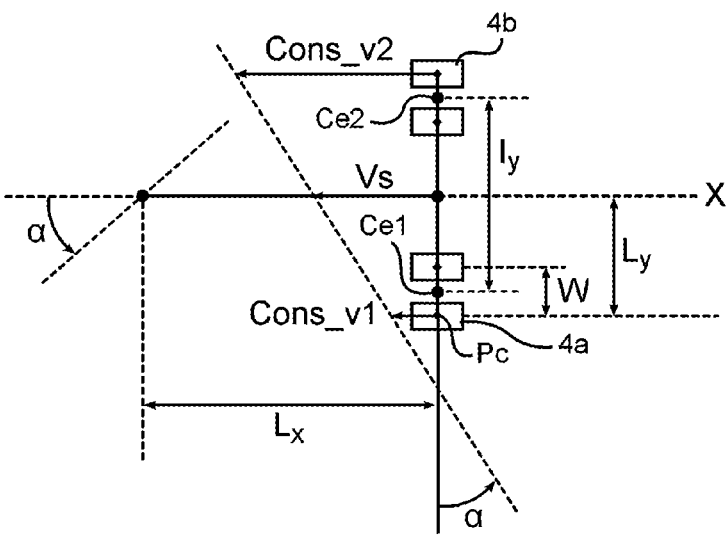
FIG. 6 is a diagrammatic view of the wheels of the aircraft while the aircraft is turning.

In a second implementation, and with reference to FIG. 6, the speed setpoint Cons_v and the acceleration setpoint Cons_a for the two outer wheels 4a and 4b are specific to each of those wheels: the speed and acceleration regulation of the two outer wheels 4a and 4b is performed via two parallel and independent regulation systems.

In the second implementation, a speed setpoint Cons_v1 for the first outer wheel 4a and a speed setpoint Cons_v2 for the second outer wheel 4b are obtained from the ground speed Vs of the aircraft, from the steering angle α of the steerable wheels, and from the structural characteristics of the aircraft 1. Thus, the speed setpoint Cons_v1 for the first outer wheel 4a is given $$\text{Cons\_v1} = \left(1 - \frac{L_y}{L_x}\tan\alpha\right)\cdot Vs$$

and the speed setpoint Cons_v2 for the second outer wheel 4b is given by:

$$\text{Cons\_v2} = \left(1 + \frac{L_y}{L_x}\tan\alpha\right)\cdot Vs \text{ with}$$

$$L_y = \frac{\ell_y + w}{2}$$

where $L_y$ is the distance between a longitudinal central axis of the aircraft 1 and a central point Pc of an outer wheel 4a or 4b, $l_y$ is the distance between the centers Ce1 and Ce2 of the axles of the two main undercarriages, and w is the distance between the two central points of the two wheels on any one main undercarriage.

The invention is not limited to the particular implementations described above, but on the contrary covers any variant coming within the ambit of the invention as defined by the claims.

Although the description relates to fitting actuators for driving the outer wheels of the main undercarriages of the aircraft, the method of the invention may naturally be performed on one or more other wheels. Likewise, the invention is naturally applicable to aircraft having some other number of undercarriages, some other number of wheels, or indeed some other arrangement of wheels on their undercarriages.

To illustrate the invention, use is made of a control architecture combining a centralized unit having an acquisition module and a processor module, power units, etc. The invention may naturally be implemented within an architecture that is different, presenting a different distribution of functions within different pieces of equipment. For example, the centralized unit could include a centralized power module replacing the power units, etc.

It can also be seen that the control method of the invention can be implemented very simply in any type of aircraft in which at least one wheel is provided with an electric motor for driving said wheel in rotation. In order to implement the control method of the invention in an existing control architecture, it suffices to program the servo-control loop in a centralized unit of that architecture. There is thus no need to add electrical equipment to the existing architecture, to replace cables, etc.

Likewise, although it is stated that the speed order is transmitted directly to the centralized control unit as a result of the pilot acting on a control lever, the speed order could also be generated by a computer, in particular in the context of the aircraft taxiing automatically.

Although it is stated that the signal representative of the acceleration Ar of the wheel is obtained by differentiating the signal representative of the speed Vr of the wheel, this signal could equally well be obtained by measuring the acceleration of the wheel, e.g. by means of an accelerometer positioned on the wheel.

Likewise, although the return signal of the first servo-control loop is described as being a signal representative of the speed of the wheel, and the return signal of the second control loop is described as being a signal representative of the acceleration of the wheel, it is possible to use as return signals a signal representative of the speed of the aircraft and a signal representative of the acceleration of the aircraft, said speed of the aircraft and acceleration of the aircraft preferably being a longitudinal speed of the aircraft and a longitudinal acceleration of the aircraft. These representative signals are obtained by measurement, by estimation, or by calculation, etc.

Mention is made of a first torque saturation function 39 and of an anti-saturation function, together with limits on the torque command corresponding to limits determined as maximum torque C_max1, C_max2, and C_max3. It is also possible to provide additional limit and saturation functions for implementing additional protection measures, by defining at least one new maximum limit torque, without making any structural or functional modifications to the regulation. Such additional protection measures may seek for example to protect mechanical elements of the actuator, or indeed to protect the electrical power generators of the aircraft against overvoltage, etc. When the anti-saturation function and the corrected torque command limits are performed simultaneously by implementing a combined limitation function, it then suffices to recalculate the overall acceptable maximum torque C_maxg while taking account of the new maximum limit torque.

The invention claimed is:

1. A control method for an electronic controller (8) to generate a torque command for controlling an electric motor driving rotation of an aircraft wheel (4a, 4b), the method comprising:
   implementing in said electronic controller a first servo-control loop (23) having as its input signal a speed setpoint (Cons_v), having as its return signal a signal representative of the speed (Vr) of the wheel or of the aircraft, and having as its output signal an acceleration setpoint (Cons_a); and
   implementing in said electronic controller a second servo-control loop (24) having as its input signal the acceleration setpoint (Cons_a), as its return signal a signal representative of the acceleration (Ar) of the wheel or of the aircraft, and as its output signal the torque command, wherein said torque command is provided to control said electric motor.

2. The control method according to claim 1, wherein the first servo-control loop includes a first subtracter (27) for calculating a speed error (εv) by subtracting the signal representative of the speed of the wheel from the speed setpoint, a gain block for multiplying the speed error (εv) by a predetermined gain so as to generate an acceleration command, and a limit function for limiting the acceleration command and for generating the acceleration setpoint.

3. The control method according to claim 2, wherein the limit function is a slope of acceleration as a function of ground speed (Vs) of the aircraft (1).

4. The A control method according to claim 1, wherein the second servo-control loop (24) includes a second subtracter (31) for calculating an acceleration error ($\epsilon a$) by subtracting the signal representative of the acceleration of the wheel from the acceleration setpoint, a first branch (33) including a low-pass filter (34), a second branch (35) parallel with the first branch (33) and including an integrator (36), and a summing circuit (42) for adding together the signals from the first and second branches.

5. A control method for generating a torque command for controlling the respective electric motors of first and second aircraft wheels, comprising:
   implementing in an electronic controller a first servo-control loop (23) having as its input signal a speed setpoint (Cons_v), having as its return signal a signal representative of the speed (Vr) of the wheel or of the aircraft, and having as its output signal an acceleration setpoint (Cons_a); and
   implementing in said electronic controller a second servo-control loop (24) having as its input signal the acceleration setpoint (Cons_a), as its return signal a signal representative of the acceleration (Ar) of the wheel or of the aircraft, and as its output signal the torque command;
   wherein for the motor (6a) of the first wheel (4a) and for the motor (6b) of the second wheel (4b), the speed setpoint is a setpoint common to both motors.

6. The control method according to claim 5, further including implementing in said electronic controller an assistance function (41) for providing assistance to steering the aircraft (1), said assistance function having as inputs the output from the second servo-control loop (24) of the motor of the first wheel (4a), the output of the second servo-control loop (24) of the motor of the second wheel (4b), and the steering angle ($\alpha$) of a nosewheel of the aircraft, and having as its output a first corrected torque command for the motor of the first wheel and a second corrected torque command for the motor of the second wheel.

7. The control method according to claim 6, wherein the assistance function (41) for providing assistance in steering the aircraft (1) is activated and deactivated by pin-programming.

8. The control method according to claim 1 for controlling the electric motors of first and second aircraft wheels, wherein, for the motor of the first wheel (4a) and for the motor of the second wheel (4b), the speed setpoint is specific to each wheel, and the signal representative of the speed of each wheel is a measurement of the speed of each wheel.

* * * * *